United States Patent [19]
Coe

[11] Patent Number: 5,197,696
[45] Date of Patent: Mar. 30, 1993

[54] LEADING EDGE CANOPY
[75] Inventor: William J. Coe, Deland, Fla.
[73] Assignee: P.D. of Miami, Inc., Deland, Fla.
[21] Appl. No.: 675,739
[22] Filed: Mar. 27, 1991
[51] Int. Cl.⁵ .............................................. B64D 17/02
[52] U.S. Cl. ...................................... 244/145; 244/130
[58] Field of Search ................. 244/130, 145; 52/2.22, 52/2.23

[56] References Cited
U.S. PATENT DOCUMENTS

| | | | |
|---|---|---|---|
| 3,893,641 | 7/1975 | Sutton | 244/145 |
| 4,389,031 | 6/1983 | Whittington | 244/145 |
| 4,846,424 | 7/1989 | Prouty | 244/145 X |

FOREIGN PATENT DOCUMENTS 2558791 8/1985 France ................................ 244/145

Primary Examiner—David M. Mitchell
Assistant Examiner—Carla Mattix
Attorney, Agent, or Firm—Malin, Haley, McHale, DiMaggio & Crosby

[57] ABSTRACT

A canopy with an improved leading edge structure is provided. The canopy will include a top and bottom surface connected at their respective trailing edges. A plurality of rib members will extend from the trailing edge to the leading edge of the canopy. A portion of the top surface leading edge will overlap with a top portion of the rib leading edge.

2 Claims, 3 Drawing Sheets

LEADING EDGE CANOPY

BACKGROUND OF THE INVENTION

1. Field of the Invention

The present invention relates to parachutes, and more particularly to an improved parachute leading edge structure and shape.

2. Description of the Prior Art

Conventional canopies are well known in the art. These canopies usually have a top and bottom surface. The canopy will have a leading and trailing edge. The bottom and top surface will usually be connected at their respective trailing edges. These canopies also include a plurality of rib members extending from the trailing to the leading edge. The rib members in conjunction with the top and bottom surface will define a plurality of air chambers. The respective leading edges of the top and bottom surface and the rib members will have leading edge reinforcements. In conventional canopies the rib leading edge reinforcement terminates at the top surface leading edge reinforcement.

The air movement past the top surface of the canopy must travel faster than air movement past the bottom surface for the canopy to lift. The difference in speed leads to a decreased pressure over the top of the canopy, a pressure which is equivalent to a suction force that lifts the canopy. The greater the difference in air speeds surrounding the top and bottom surfaces, the greater the lift that is produced, provided the canopy shape is not so extreme that turbulence results.

Wing-type parachutes are known to be inherently unstable. The lift they produces equals the suspended weight therefrom. The lift is a function of air speed and the angle of attack. The angle of attack is determined by where the center of pressure is located and the center of pressure is determined by the angle of attack. This leads to an inherently unstable parachute. When the angle of attack is decreased, the air speed increased and the center of pressure moves. This causes the angle of attack to be further reduced, which in turn causes the center of pressure to move aft and the air speed to increase. This cycle continues until either the drag increases enough to stabilize the system, or the canopy goes beyond the zero lift line and collapses.

By having its rib leading edge terminate at the top surface leading edge reinforcement, turbulence occurs. As mentioned above, this turbulence reduces the canopy lift. Therefore, there exists a need for an improved canopy leading edge structure that will reduce turbulence in order to increase the canopy lift. In addition, conventional canopies are known to open very quickly. By opening quickly, the canopy experiences deployment shock loads. Therefore, there exists a need for an improved canopy leading edge structure that will cause the canopy to open slower than conventional canopies and, thus, reduce deployment shock loads.

SUMMARY OF THE INVENTION

It is an object of the present invention to provide a parachute with an improved leading edge structure and shape.

It is another object of the present invention to provide a parachute with improved low speed performance.

It is yet another object of the present invention to provide a parachute with improved high speed stability.

It is still another object of the present invention to provide a parachute with increased strength.

It is even still another object of the present invention to provide a parachute which reduces deployment forces.

It is still further another object of the present invention to provide a parachute which is aerodynamically cleaner.

It is yet another object of the present invention to provide a parachute which will reduce deployment shock loads.

These and other objects are accomplished by a canopy having a top and bottom surface. The canopy will have a leading and trailing edge. The top and bottom surface will be connected at their respective trailing edges. In addition, the canopy will contain a plurality of rib members extending longitudinally from trailing edge to the leading edge. The rib members will be connected to the inside side of top and bottom surface by any conventional means such as seams, sewing, stitching, taping, gluing or any other suitable connecting method. The top and bottom surface and the rib members will all have leading edge reinforcements. In conventional canopies the rib leading edge reinforcement will terminate at the top surface leading edge reinforcement. These canopies created alot of turbulence at this reinforcement meeting point which hampers the canopy's performance. However, in the present invention the rib leading edge reinforcement extends inside the top surface seam. By having the rib leading edge reinforcement extend past the top surface leading edge reinforcement and not terminate at the top surface leading edge reinforcement, the reinforcement meeting point created in conventional canopies will be eliminated. Thus, less turbulence will be present and the canopy will increase in performance.

In addition, the canopy of the present invention with its improved leading edge structure will open slower than conventional canopies. By opening slower the canopy will reduce deployment forces and shock loads. The canopy's strength will be increased as well as being aerodynamically cleaner. The present invention will also improve low speed performance and high speed stability.

Other objects and advantages of the invention will become apparent from the consideration of the following detailed description of the invention.

DETAILED DESCRIPTION OF THE INVENTION

Figure 1:
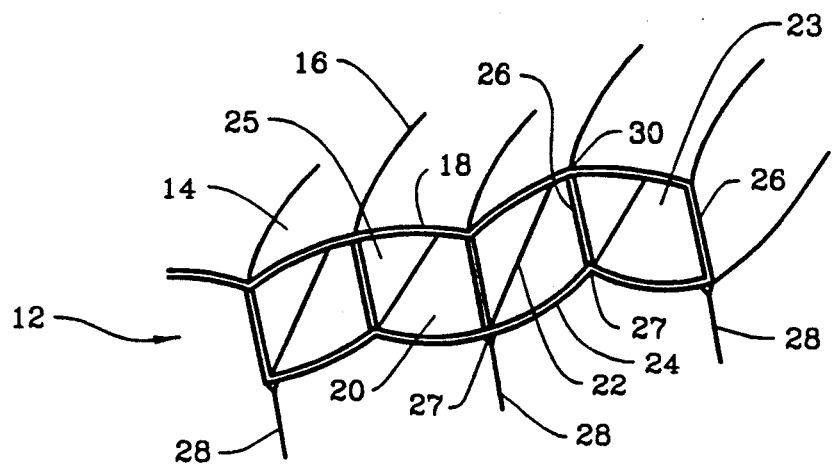
FIG. 1 is a front sectional view of a prior art canopy construction.
Figure 2:
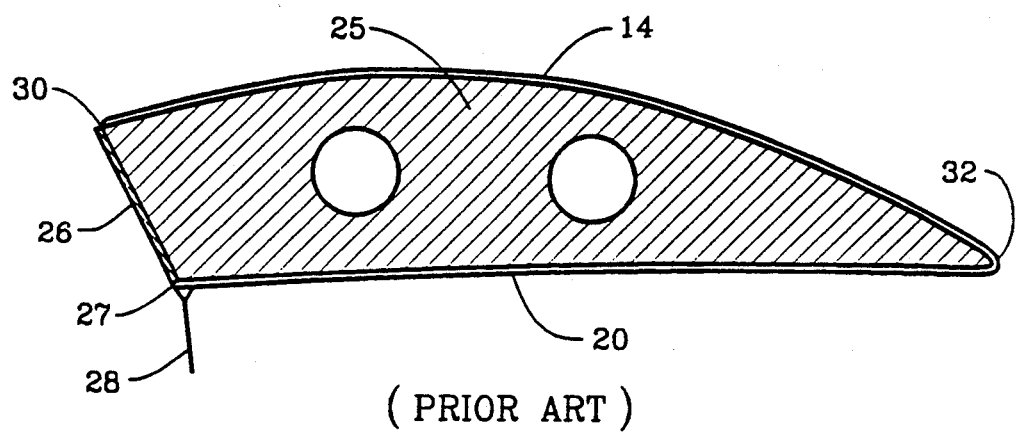
FIG. 2 is a side view of the prior art canopy construction of FIG. 1.

A conventional canopy construction 12 is shown in FIGS. 1 and 2. The canopy has a top surface 14 and bottom surface 20. Top surface 14 and bottom surface 20 are connected at their respective trailing edges 32. Top surface 14 has a leading edge reinforcement 18 and bottom surface 20 has a leading edge reinforcement 24. A plurality of rib members 25 extending from front to trailing edge are attached to top surface 14 at top surface rib seam 16 and at bottom surface 20 at bottom surface rib seam 22. The rib members 25, in conjunction with top surface 14 and bottom surface 20, define a plurality of air chambers 23. Lastly, suspension lines 28 are attached to a plurality of bottom surface points 27.

Rib members 25 have a leading edge reinforcement 26. In the conventional canopy 12 of FIGS. 1 and 2 it is seen that top surface leading edge reinforcement 18 and rib leading edge reinforcement 26 meet to form point 30 without any overlap of the edges 18 and 26. Accordingly, leading edge reinforcement 26 terminates at top surface leading edge reinforcement 18. Additionally, the top surface leading edge reinforcement 18 does not reverse directions. In other words, top surface leading edge reinforcement 18 does not go forward before going aft.

Figure 3:
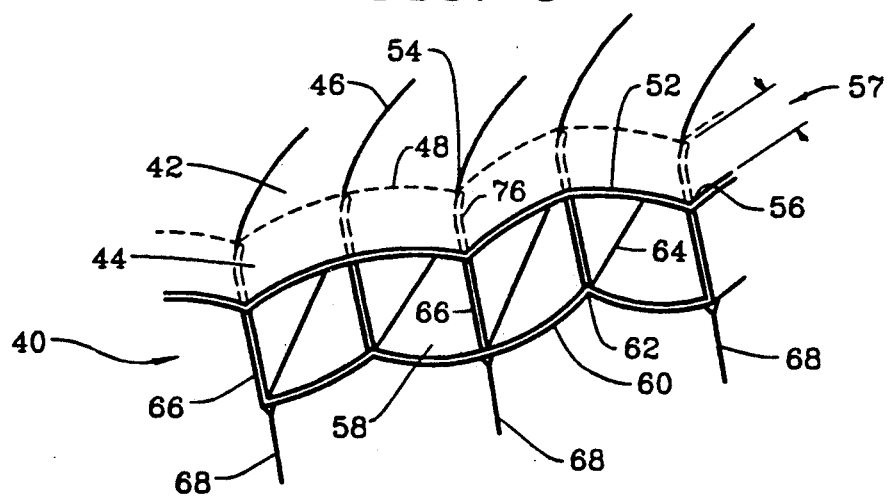
FIG. 3 is a front sectional view of an improved leading edge canopy construction in accordance with the present invention.
Figure 4:
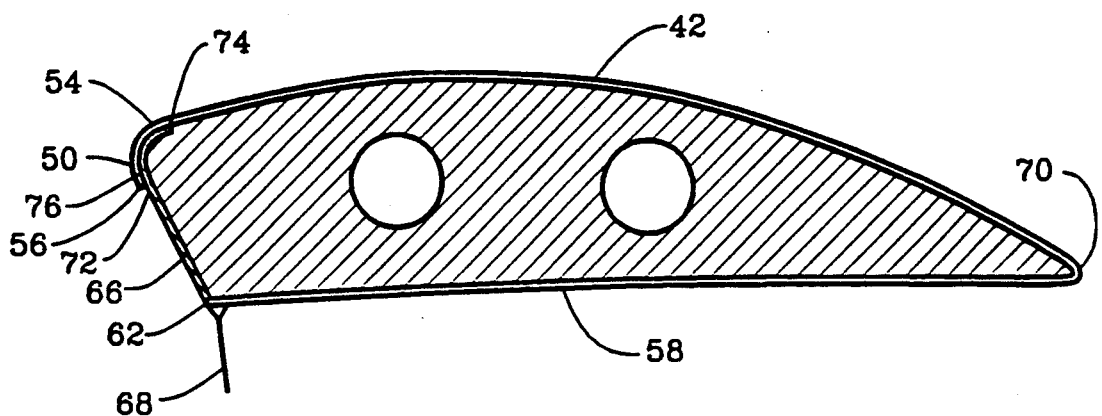
FIG. 4 is a side view of the improved leading edge canopy construction of FIG. 3.

From the present invention shown in FIGS. 3 and 4 it is seen that rib leading edge reinforcement 66 and top surface leading edge reinforcement 52 overlap at a top leading edge extension 50 and a rib reinforcement extension 76. Therefore, rib leading edge reinforcement 66 extends past the top surface leading edge reinforcement 52, inside the top surface rib seam 46 by a certain distance. This distance is shown at 57. From FIG. 4 it is seen that top leading edge extension 50 extends down along the rib leading edge reinforcement extension 76 in a reverse direction from top surface 42. The bottom surface 58 and suspension lines 68 will be attached in accordance with conventional canopies such as canopy 12. In addition, the fabric sections of canopy 40 can be made of the high strength, lightweight fabric of suitable porosity used in conventional canopies such as canopy 12.

This new configuration will provide several advantages over conventional canopies such as canopy 12 in FIG. 1. As seen in FIG. 1, stress risers appear just aft of point 30. These stress risers will increase the likelihood of failure of canopy 12. However, these stresses are better distributed from the canopy 40 to top surface leading edge reinforcement 52 in the present invention. Because rib leading edge reinforcement extension 76 extends well into the top surface rib seam 46 the area is increased for the stress loads to travel into the top surface leading edges reinforcement 52 and rib leading edge reinforcement extension 76.

Figure 5:
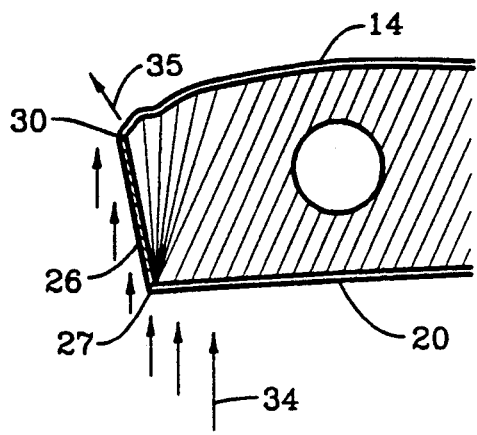
FIG. 5 is a side view of the prior art canopy construction of FIG. 1 during deployment.
Figure 6:
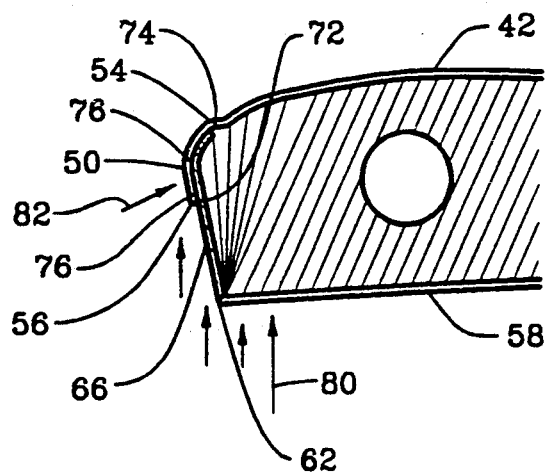
FIG. 6 is a side view of the improved leading edge canopy construction of FIG. 3 during deployment.

During deployment, conventional canopy 12 due to its leading edge shape tends to open very fast. The present invention will slow down the opening of canopy 40. As seen in FIGS. 5 and 6, the leading edges of the respective canopies 12 and 40 are shown during deployment, just as canopies 12 and 40 start to inflate.

As seen in FIG. 5 the front part of the canopy 12 is blown up and rotates aft prior to inflation. As soon as inflation starts the relative wind 34 hits top surface 14 from the inside side of top surface 14. This generates a force 35 that tends to pull the nose 31 into the relative wind 34. This in turn exposes more of the nose opening 31 to the relative wind 34 causing the canopy 12 to open faster. The canopy 40 of the present invention, by its improved air inlet shape, will slow down the time canopy 40 opens. As seen in FIG. 6, the outside of top leading edge extension 50 will be struck by the relative wind 80 causing a resulting force 82. Resulting force 82 will push the top leading edge extension 50 aft effectively reducing the leading edge air inlet area exposed to the relative wind 80. Thereby, the canopy 40 will be opened slower. In addition, the present invention is a very effective method of reducing deployment shock loads.

Figure 7:
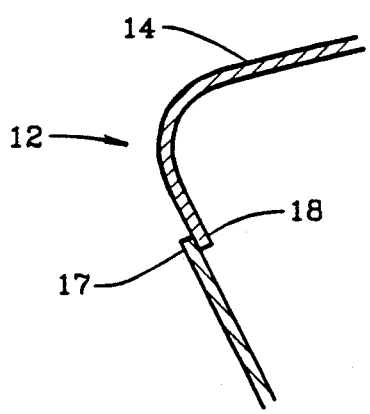
FIG. 7 is a sectional side view of a prior art canopy construction with its leading edge extended below the chord line.
Figure 8:
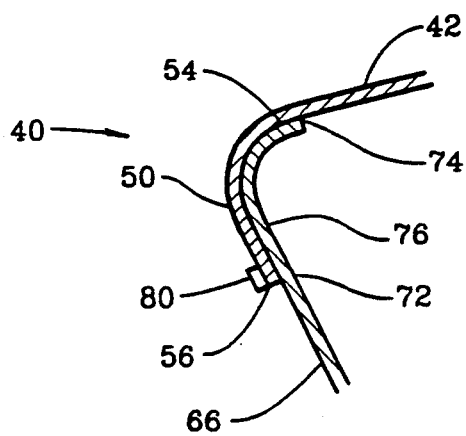
FIG. 8 is a sectional side view of the improved leading edge canopy construction having its leading edge extended below the chord line.

Canopy 40 will allow the leading edge to remain tangent to the air flow with a more complete air foil, thereby improving efficiency. As seen in FIG. 7 when the top surface 14 starts below the chord line canopy 12 a lip 17 is formed by the top surface leading edge reinforcement 18 to rib leading edge reinforcement 26 junction. This lip 17 causes turbulence and/or separation of the air flow, causing reduced lift. However, as seen in FIG. 8, the present invention eliminates lip 17 by rotating the top surface leading edge reinforcement 52 90°. The canopies shape is less extreme thereby reducing turbulence and creating a greater lift.

Figure 9:
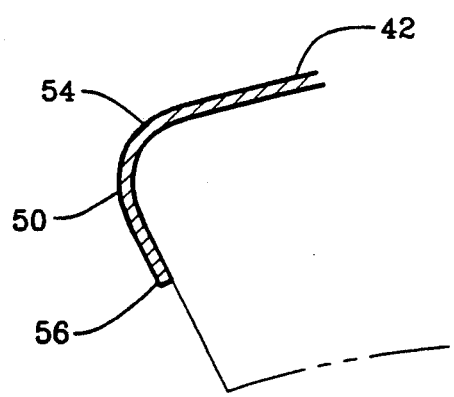
FIG. 9 is a sectional side view of the improved leading edge canopy construction at a relatively high angle of attack.

As seen in FIG. 9, the present invention will improve low speed performance by changing the shape of the top leading edge extension 50 to the angle of attack. The angle of attack is defined arbitrarily as the acute angle between the direction of relative wind 80 and the chord line. When canopy 40 is at a high angle of attack, it inflates forming a better inlet shape then conventional canopies such as canopy 12. This will reduce the stall speed and provide the better sink characteristics of a much fatter canopy.

Figure 10:
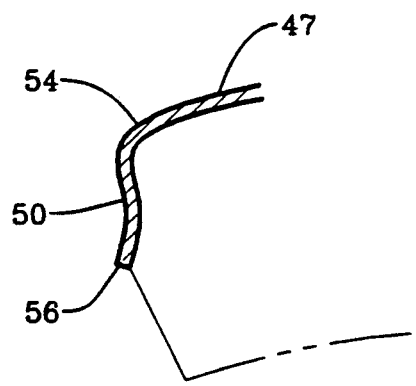
FIG. 10 is a sectional side view of the improved leading edge canopy construction at a reduced angle of attack as compared to the angle of attack of FIG. 9.

For high speed flight the angle of attack will be reduced. The present invention will promote stability during high speed flight by limiting the change in center of pressure locations. The center of pressure is defined as the inner section of the resultant air force with the inside side of top surface 42. On canopies such as canopy 12, the air inlet is very large and causes alot of drag. This drag rapidly dampens the above mentioned instability. When the air inlet size is decreased canopy 12 becomes unstable. As seen in FIG. 10, the present invention will resist this type of collapse by changing the shape of top leading edge extension 50 according to the angle of attack. As the angle of attack decreases the top leading edge extension 50 cups. The faster canopy 40 goes, the more pronounced the cup shaped extension 50 becomes. The cup shaped extension 50 increases air flow turbulence and the canopy 40 drag at high speed. The increased drag limits how fast canopy 40 can go, though stabilizing the canopy 40.

The instant invention has been shown and described in what is considered to be the most practical and preferred embodiment. While there has been described above the principles of this invention in connection with the specific apparatus, it is to be clearly understood that this description is made only by way of example and not as a limitation to the scope of the invention. It is recognized that departures may be made therefrom within the scope of the invention and that obvious modifications will occur to a person skilled in the art.

What is claimed is:

1. An improved canopy, comprising:
   (a) a conventional top surface having a leading edge and a trailing edge, said top surface having a leading edge reinforcement;
   (b) a conventional bottom surface having a leading edge and a trailing edge, said bottom surface connected to said top surface at said trailing edges, said bottom surface having a leading edge reinforcement;
   (c) a plurality of rib members extending from said trailing edge to said leading edge, said rib members connected to said top surface and said bottom surface to define a plurality of air chambers, said rib members having a top and bottom end, said rib members having a rib leading edge reinforcement;

wherein the leading edge reinforcement of said top surface overlaps and is attached to a top portion of the rib leading edge reinforcement of said rib members to define a means for reducing inlet air flow at the leading edge of the canopy.

2. The improved canopy of claim 1, further comprising a plurality of suspension lines having one end attached to various locations of said bottom surface.

* * * * *